June 24, 1958   R. C. MORRIS   2,840,415
EGG HANDLING APPARATUS
Filed Sept. 27, 1955   2 Sheets-Sheet 1
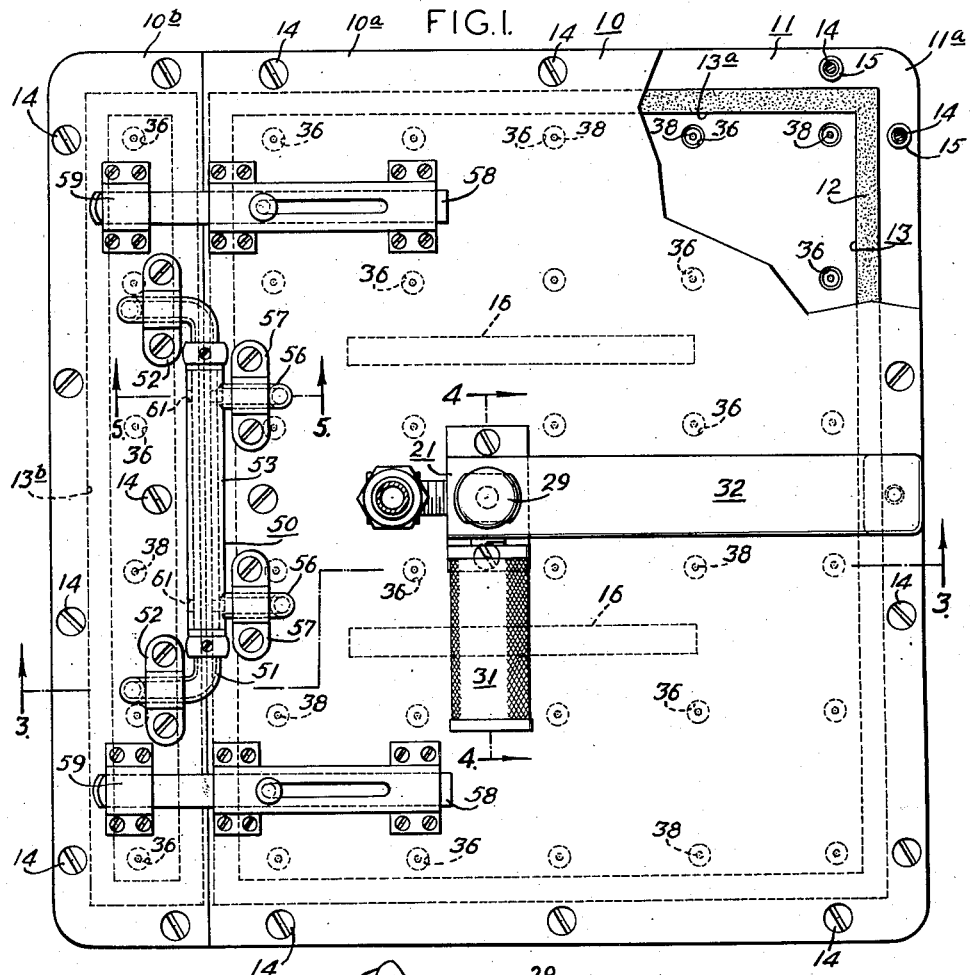
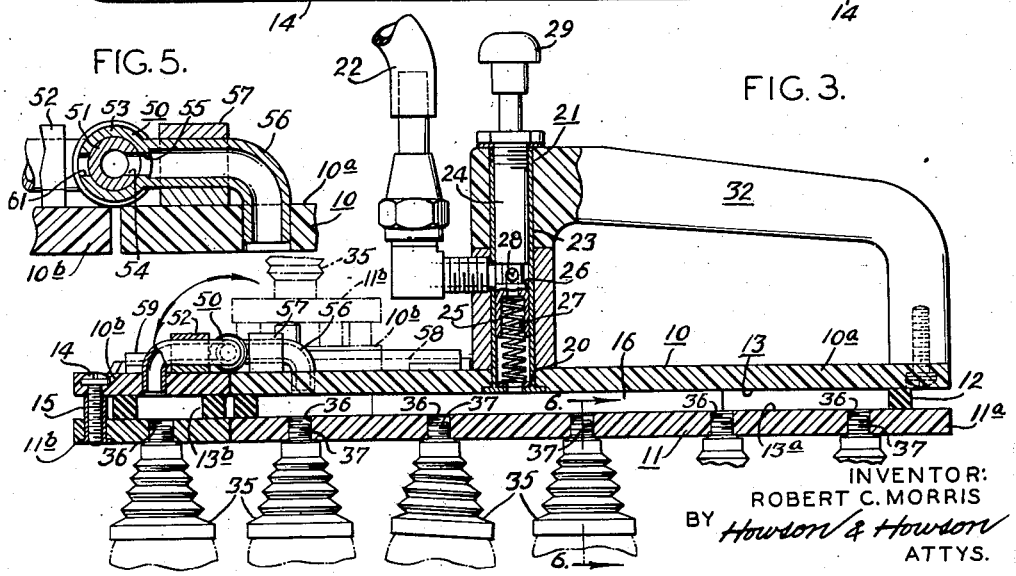
INVENTOR:
ROBERT C. MORRIS
BY Howson & Howson
ATTYS.

June 24, 1958  R. C. MORRIS  2,840,415
EGG HANDLING APPARATUS
Filed Sept. 27, 1955  2 Sheets-Sheet 2
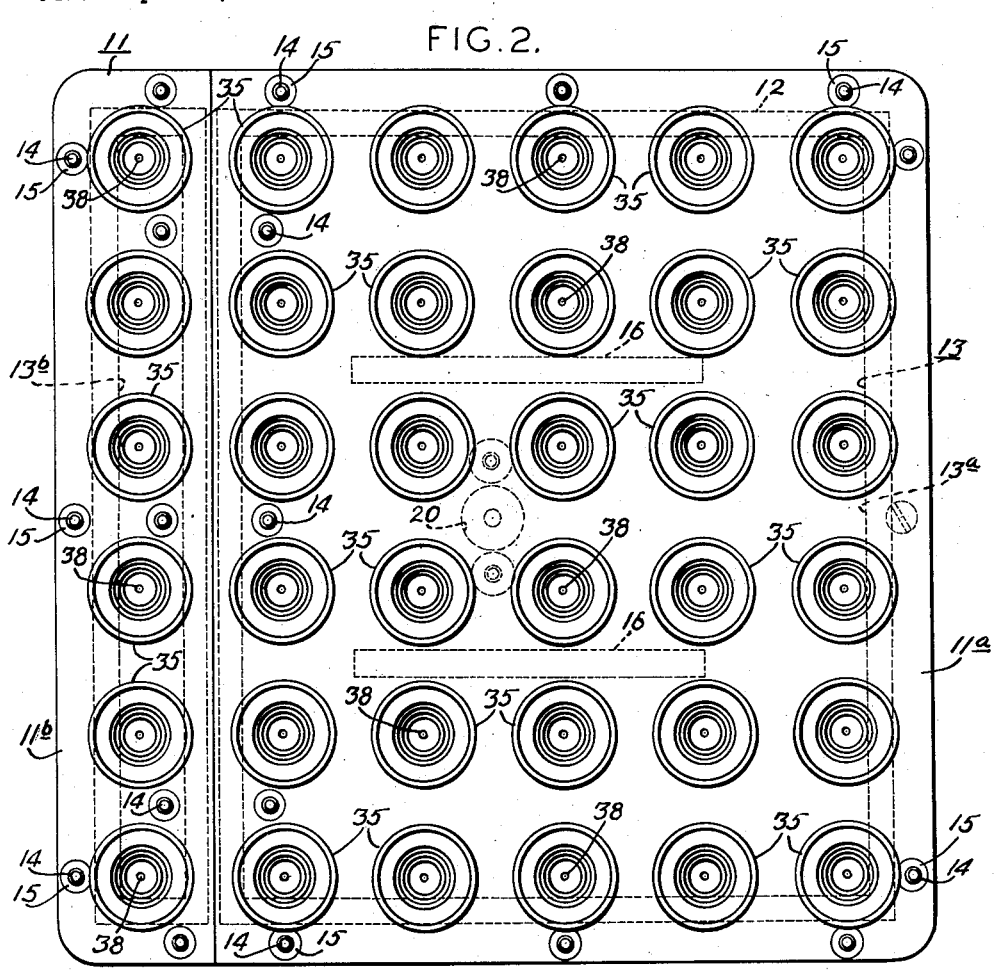
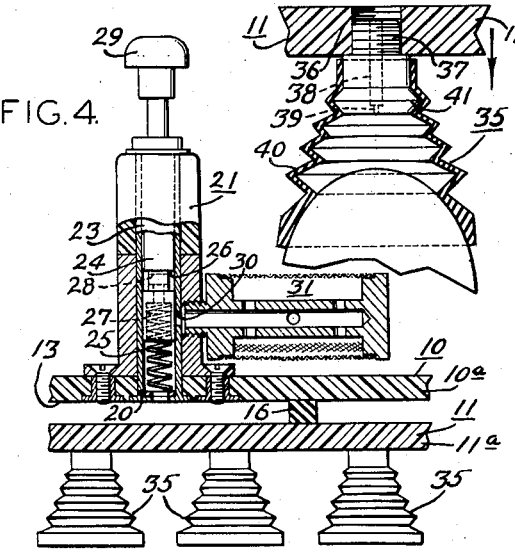
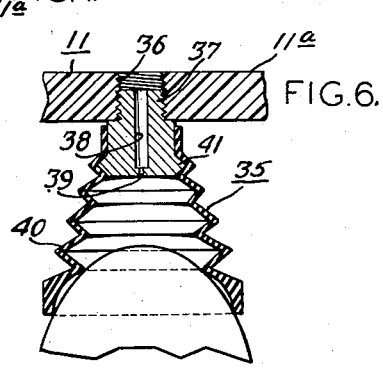
INVENTOR:
ROBERT C. MORRIS
BY
Howson & Howson
ATTYS.

United States Patent Office 2,840,415
Patented June 24, 1958

2,840,415

EGG HANDLING APPARATUS

Robert C. Morris, Trappe, Md., assignor to American Hatchery Engineers, Inc., Easton, Md., a corporation of Maryland Application September 27, 1955, Serial No. 536,934

4 Claims. (Cl. 294—65)

The present invention relates to an egg handling apparatus and more particularly to a vacuum-actuated device for picking up and depositing eggs.

The present invention has particular utility in devices for transferring eggs from packing crates to cartons, incubator trays, or other egg handling equipment. The conventional egg crates consist of two sections, each receiving six rows of eggs containing six eggs each. Other crates are on the market which receive five rows of eggs of six eggs each. Still other crates which are coming into use consist of two sections, each receiving eight rows of eggs of six eggs each. The present invention contemplates a device which is capable of engaging all of the eggs in each section of the various crates currently employed in the industry.

The device of the present invention is light in weight and susceptible of single hand operation, to pick up a section of eggs by suction or vacuum. Although vacuum pickup devices for eggs have been proposed prior to the present invention, none has been successful because of the excessive weight, or of the construction which makes cleaning very difficult. In egg handling apparatus, it is imperative that the device be readily cleaned since it frequently occurs that a cracked egg is in the crate. When the suction device engages a cracked egg, it is likely to draw the albumen from the egg into the suction system. When the albumen is exposed to air, it solidifies and forms a crust which impairs the operation of the suction system. When this occurs, weak suction results and the pickup device is likely to fail to retain the eggs during transfer from the crate to other locations.

With the foregoing in mind, a primary object of the present invention is to provide an improved vacuum pickup device which is capable of single hand operation.

Another object of the present invention is to provide a device which is light in weight, yet which is sufficiently durable to resist failure in normal operation.

Still another object of the present invention is to provide a device which is of simple manufacture, and is readily disassembled for cleaning.

These and other objects of the present invention and the various features and details of the construction and operation thereof are more fully set forth hereinafter with reference to the accompanying drawings in which:

Fig. 1 is a plan view of an egg pickup mechanism made in accordance with the present invention;

Fig. 2 is a bottom inverted plan view of the device illustrated in Fig. 1;

Fig. 3 is a sectional view taken on the line 3—3 of Fig. 1;

Fig. 4 is a fragmentary sectional view taken on the line 4—4 of Fig. 1;

Fig. 5 is a sectional view taken on the line 5—5 of Fig. 1;

Fig. 6 is a sectional view taken on the line 6—6 of Fig. 3, showing a cup engaging a small egg; and Fig. 7 is a view similar to Fig. 5 showing a cup engaging an enlarged egg.

Referring now to the drawings, the egg pickup device comprises first and second spaced plates 10 and 11 respectively. Preferably, the plates are composed of transparent plastic so that the cleanliness thereof may be readily ascertained, but any suitable lightweight rigid material may be employed.

The first and second plates 10 and 11 are held in spaced parallel relation by a sealing member 12 extending continuously about the periphery of the plates. The plates and the walls of the sealing strip define a vacuum chamber 13 therebetween. The sealing strip 12 is compressed between the plates 10 and 11 by a plurality of bolts or screws 14 located at spaced intervals around the periphery of the plate 10 and engaging threaded ferrules 15 mounted in the plate 11. The bolts and ferrules effect a clamping engagement of the plates 10 and 11 upon the sealing member 12 to insure a fluid-tight compartment 13. To provide further structural rigidity, structural spaces 16, 16 are mounted intermediate the plates 10 and 11 centrally thereof. If desired, the spacer elements 16 may be composed of material similar to the sealing member 12 in order to insure equal compression of the members 16 and the member 12.

Means is provided to evacuate the chamber 13. To this end, the plate 10 is provided with a central aperture 20 having mounted therein a valve assembly 21. As shown in Figs. 3 and 4, the valve assembly 21 is open at one end through the apertures 20, to the chamber 13, and is connected at the other end to a conduit 22 leading to a source of vacuum. The assembly comprises a cylinder 23 having therein a piston 24 biased upwardly by a spring 25 to maintain fluid communication between the conduit 22 and the chamber 13 through a groove in the piston 24, as indicated at 26 which communicates with a hollow bore 27 in the valve element by means of an aperture 28. The valve is actuated by a button operator 29. When the button operator 29 is in the upper position (shown in Figs. 3 and 4) the groove 26 is in registry with the conduit 22 to the source of vacuum. When the valve piston 24 is displaced downwardly by pressing on the button 29, the groove 26 passes into registry with an inlet port 30 (see Fig. 4) which releases the vacuum in the chamber 13. As shown in Fig. 4, the inlet port 30 is provided with a suitable filter 31 to guard against the injection of dirt or other foreign material into the chamber 13 through the port 30.

To provide single hand operation of the device, a handle 32 is mounted on the plate 10 adjacent the valve casing 21. In the present instance, the handle 32 embraces the upper portion of the valve assembly, and extends rearwardly to the marginal edge of the plate 10, but it is within the scope of the invention to mount the handle at both ends directly on the plate 10 alongside or in closely spaced relation to the valve assembly 21.

The bottom plate 11 mounts a plurality of egg-engaging suction cups 35. As shown in Fig. 2, the cups are disposed in rows of equal number, in the present instance, six. The mounting of the cups affords ready assembly and disassembly for cleaning. To this end, the bottom plate 11 is formed with a plurality of threaded apertures 36 which threadably receive a plug 37 of the cup 35. The threaded plug 37 is provided with a central bore 38 having at its lower extremity a reduced portion 39. Preferably, the reduced portion 39 has a diameter of .062 inch, this dimension being sufficiently large to insure full vacuum within the body of the cup but being sufficiently small to impede passage of albumen and the like therethrough.

The body of the cup 35 is formed by a flexible sheath 40 having a plurality, in the present instance four, accordion pleats. The sheath 40 is anchored to the block or plug 37 by a suitable adhesive and by engagement of a tapered boss 41 on the plug 37, within the uppermost accordion pleat. The plug 37 is readily disengageable from the plate 11 by reason of the threaded engagement thereof with the threaded aperture 36. Thus, when the bore of a plug becomes clogged, or otherwise ineffective, the defective suction cup assembly 35 may be threaded from the aperture 36 and cleaned individually. As pointed out above, if albumen or other foreign material should be drawn into the suction chamber 13, the plates 11 and 10 may be disengaged for cleaning by releasing the bolts and ferrules 14 and 15. To prevent loss of the sealing element 12, the element is preferably cemented to one of the plates 10 and 11. Thus, the pickup device of the present invention may be readily disassembled for cleaning or repair.

In accordance with the present invention, means is provided to adapt the device to pick up different numbers of eggs. In the present instance, the bottom plate 11 and the top plate 10 are fabricated in two sections, main sections 11a and 10a respectively, and minor sections 11b and 10b respectively. The plates 10a and 11a form therebetween a main chamber 13a and the plates 10b and 11b form therebetween a minor chamber 13b. A valve 50 affords fluid communication between the chambers 13a and 13b in one position, and isolates the chambers in a second position.

In the illustrated form of the invention, the minor section is hingedly connected to the major section, the valve 50 being formed integrally with the hinge. To this end, a hollow tubular member 51 is mounted on the minor section 10b of the plate 10, for example as indicated at 52, 52 having its bore in fluid communication with the chamber 13b, as shown in Fig. 3. The central portion of the tubular member 51 overlies the dividing line between the members 10a and 10b in parallelism therewith, and is received in an elongated tubular collar 53 for rotation therein. The tubular member 51 and the collar 53 are provided with a pair of registering apertures indicated at 54 and 55 respectively which register when the major and minor sections are in the full line position shown in Figs. 1 and 3. The apertures 55 communicate with the major chamber 13a through tubular conduits 56 mounted on the plate 10a as indicated at 57. To provide further structural rigidity for the unit when in the full line position, a slide 58 is mounted at each side of the unit on the plate 10a for sliding movement into engagement with a keeper 59 on the plate 10b. When the slides 58, 58 are in the full line position shown in Fig. 1, the minor sections 10b and 11b are retained in alignment with the major sections 10a and 11a as shown in Fig. 3. In this position, the chambers 13a and 13b are in fluid communication, and suction is applied to all of the cups 35 when the operator 29 is in the upper limit position. Displacing the operator 29 to the lower limit position connects the chambers 13a and 13b with atmosphere through the port 30 thereby releasing suction from the cups 35.

When using only the major portion of the pickup device, the minor portion is pivoted into overlying relationship to the major portion, as indicated in broken lines in Fig. 3. Pivotal movement is effected by releasing the slides 58 to their right hand limit position thereby disengaging the keepers 59, and swinging the tubular element 51 within the collar 53. Swinging movement of the tubular element 51 causes the apertures 54 and 55 to pass out of registry and closes communication between the chambers 13a and 13b. Ports 61, 61 opening to the atmosphere are provided in the collar 53 diagonally opposite the ports 55, 55 so that when the minor section is swung to the broken line position of Fig. 3, the chamber 13b is opened to the atmosphere through the tubular member 51, the port 54, and the port 61.

These illustrated embodiments of the invention are particularly adapted to uses where first a given number, for example, thirty-six eggs is desired to be picked up, than a lesser number, for example thirty eggs is desired to be picked up, and especially in installations where the side walls of the containers are closely adjacent the eggs. Where there is ample clearance between the side walls and the eggs, the minor sections 11b and 10b of the plates 11 and 10 may be formed integrally with the major sections 11a and 10a. In this instance, a simple tubular connection is made between the chambers 13a and 13b, and a two-position valve similar to the valve 50 is connected in the tubular connection to selectively connect the chamber 13b with the chamber 13a and atmosphere. In this modification of the invention, it is also possible to pick up a full complement of eggs with the cups connected to the chambers 13a and 13b, and then release first the eggs engaged by the cups connected with the chamber 13b, and then thereafter the eggs engaged in the cups communicating directly with the chamber 13a. This modification has particular application to transferring eggs from crates to incubator trays which receive a lesser number of rows of eggs than there are rows in the crate.

In installations where only a given number of eggs is to be picked up for a prolonged period of time, and then a different number of eggs for a similar period of time, it is contemplated that the major and minor sections be formed integrally and with the major and minor chambers 13a and 13b in open communication. When handling the given number of eggs, a bottom plate 11 having the given number of cups mounted therein is used, and when handling a different number, the plate 11 is removed and a second plate is substituted which has the different number of cups mounted therein. The present invention provides for ready change-over by reason of the construction consisting of spaced plates separated by a sealing member and clamped together by releasable means, such for example as the bolts and ferrules 14 and 15.

While certain embodiments of the present invention have been disclosed herein, it is not intended to limit the invention to such disclosure, but changes and modifications may be made therein and thereto within the scope of the following claims.

I claim:

1. In an egg pickup device, a first pair of flat spaced parallel plate sections and sealing walls disposed intermediate said plates about the periphery thereof and defining a main chamber therebetween, means defining an aperture opening into said main chamber, valve means connecting said aperture selectively to a source of vacuum and the atmosphere, a plurality of suction cup elements mounted in fluid communication with said main chamber, a second pair of spaced parallel plate sections normally coplanar with said first plate sections and sealing walls disposed intermediate said plates about the periphery thereof and defining a minor chamber, a plurality of suction cup elements mounted in fluid communication with said minor chamber, hinge means interconnecting said first and second pairs of plate sections operable in one position to dispose said second pair of plate sections in its normal coplanar position with said first pair of plate sections and operable in a second position to dispose said second pair of plate sections in overlying relationship to said first pair of plate sections, and valve means opening fluid communication between said main and minor chambers when said hinge is in its first position, and closing fluid communication between said main and minor chambers when said hinge is in its second position, said valve means being formed integrally with said hinge, one element of said hinge being a hollow tubular member open to said minor chamber, a second element of said hinge being a collar slidably embracing said tubular member, an aperture in said collar opening into said main chamber and an aperture in said tubular member when in the first position of said hinge registering with said collar aperture, and when in the second position of said hinge, being out of registry with said collar aperture.

2. A device according to claim 1 wherein said collar comprises means defining a second aperture opening to the atmosphere and positioned in registry with said aperture in the tubular element in the second position of said hinge.

3. In an egg pickup device, a first flat plate, a second flat plate coextensive with said first plate disposed in spaced parallel relation thereto, a sealing member mounted on one of said first and second plates about the periphery thereof, spaced inwardly of the outer edge thereof, and disposed intermediate said first and second plates in sealing engagement with the other of said first and second plates to define a chamber therebetween, means defining an aperture opening into said chamber, means engaged with said first and second plates to compress said sealing member therebetween, a handle mounted on said first plate, means connecting said aperture to a source of vacuum, a plurality of suction cup elements mounted in said second plate, each comprising a resilient cup and a hollow shaft mounting said cup and opening at one end to the interior of said cup and at the other end to the interior of the chamber defined by said first and second plates, means dividing said chamber into main and minor chambers, said chambers normally disposed coplanar in side by side relation, auxiliary valve means intermediate said main and minor chambers, means to operate said valve means between first and second positions, said auxiliary valve means operable when in the first position to provide access between said main and minor chambers and apply suction to said minor chamber, and when in the second position, closing access between said chambers and opening said minor chamber to atmosphere to release suction therein.

4. A device according to claim 3 wherein said first and second plates are provided with mutually registering apertures about the periphery outwardly of said sealing member, and wherein further said clamping means comprises bolt means passing through said apertures and engaging said plates.

References Cited in the file of this patent

UNITED STATES PATENTS

| | | |
|---|---|---|
| 1,741,021 | Hitchcock | Dec. 24, 1929 |
| 1,800,385 | Hayes | April 14, 1931 |
| 2,658,789 | Tellier | Nov. 10, 1953 |

FOREIGN PATENTS

| | | |
|---|---|---|
| 713,770 | Great Britain | Aug. 18, 1954 |